US006068273A

United States Patent [19]

Rao et al.

[11] Patent Number: 6,068,273

[45] Date of Patent: May 30, 2000

[54] SPRING-LOADED BRAKING SYSTEM FOR A WALKER

[76] Inventors: Rob K. Rao, 165 Summit Ridge Dr., Bridgeville, Pa. 15017; Mark Robinsky, 974 Sunglow St., Munhall, Pa.

[21] Appl. No.: 08/901,254

[22] Filed: Jul. 28, 1997

[51] Int. Cl.[7] .......... B62B 3/00

[52] U.S. Cl. .......... 280/87.041; 280/33.994; 280/47.34

[58] Field of Search .......... 280/33.994, 87.051, 280/87.041, 47.34, 87.042; 188/19, 20, 29, 31, 32

[56] References Cited

U.S. PATENT DOCUMENTS 4,018,440 4/1977 Deutsch .......... 188/31
4,029,311 6/1977 Chanslor et al. .......... 188/29
4,591,175 5/1986 Upton et al. .......... 280/33.994
5,538,268 7/1996 Miller .......... 280/87.031

*Primary Examiner*—Richard M. Camby
*Attorney, Agent, or Firm*—Webb Ziesenheim Logsdon Orkin & Hanson, P.C.

[57] ABSTRACT

A wheeled walker includes a walker frame with user supports and a plurality of downwardly extending legs with wheel assemblies attached to a plurality of the walker legs. Each wheel assembly includes a base member with a wheel rotatably supported on the base member and a wheel alignment mechanism for moving the base member and the wheel. The wheel alignment mechanism will move the base member and the wheel between at least a first position in which the wheel is angled with respect to the direction of travel of the walker and a second position in which the wheel is aligned with the direction of travel of the walker. The wheel mechanism moves the base member and the wheel in response to the vertical force exerted on the base and the wheel. The walker including the wheel assembly having the wheel alignment mechanism provides a method for braking a wheel walker which brakes the walker by moving the associated wheel to a position at angle with respect to the direction of travel of the walker in response to appropriate vertical forces on the walker.

20 Claims, 6 Drawing Sheets

SPRING-LOADED BRAKING SYSTEM FOR A WALKER

BACKGROUND OF THE INVENTION

1. Field of Invention

The present invention relates to alignable wheel assemblies, more particularly, the present invention relates to a walker utilizing alignable wheel assemblies providing automatic braking for the walker.

2. Background Information

Walkers have long been used to assist in the mobility of patients, particularly elderly patients with osteoporosis or muscle weakness. Typically, walkers are constructed of a framework having a user supports and a plurality of legs extending down from the user supports. The walker is intended to increase the mobility of the patient by increasing stability for the patient during walking movements. In operation, the typical walker is moved forward in advance of the patient a distance approximately an arms length away and the patient walks towards the walker holding on to the walker for added support. After the patient moves toward the walker, the walker must be moved forward again and the process repeated. The most basic, the walker designs require that the patient lift the walker and advance the walker to a new position. This creates difficulty, particularly with elderly patients with osteoporosis, who are not always capable of easily lifting the walker to advance it. Attempts to solve this problem have provided walkers with casters or wheels on the bottom of the legs. These wheeled walkers present additional problems. While the provision of wheels on the bottom of walkers make the walkers easier to advance, the walkers are not always stable. Without a braking system, the wheeled walkers would maintain an ability or tendency to roll away as the patient is walking forward. This instability of wheeled walkers would significantly decrease their usefulness. Attempts have been made to solve this new problem by incorporating a braking mechanism on the wheeled walkers. However, the braking mechanisms designed on the walkers are not always easily operated by the patients, particularly by the elderly. For example, a known type of brake consists of a caliper-type brake on one wheel actuated by a handle on the upper portion of the walker. To actuate the brake, the user needs to grip and squeeze the handle. A person who is in need of a walker is more likely to be unable to operate the actuating handle for the brake. Similar actuating problems are encountered with brake systems that are biased to an engaged position, in which the user is required to operate an actuator to disengage the brake from the wheels.

A further problem with existing braked, wheeled walkers is that the braking operation is controlled by the patient and is not automatic. Consequently, if the patient moves the brake to the unengaged position for rolling of the walker, the brake would remain so until the user reengages the braking system. Such an arrangement does not account for cases when the patient is advancing the walker and accidentally slips. Without an automatic operation, the walker continues to roll without the user having the opportunity to reengage the braking system.

It is an object of the present invention to overcome the aforementioned drawbacks of the prior art. It is a further object of the present invention to furnish a wheel assembly for a walker which gives automatic braking capabilities for the walker. It is further object of the present invention to provide a wheel assembly which is easily retrofitted to existing walkers, and the like.

SUMMARY OF THE INVENTION

The above objects of the present invention are achieved by a walker according to the present invention. The walker of the present invention includes a walker frame having user supports and a plurality of legs, and a wheel assembly attached to at least one assembly walker leg. Each wheel assembly includes a base member, a wheel rotationally supported on the base and a wheel alignment mechanism for moving the base member and the wheel. The wheel alignment mechanism will move the base member and the wheel between at least a first position in which the wheel is angled with respect to a direction of travel of the walker and a second position in which the wheel is aligned with the direction of travel of the walker. The wheel alignment mechanism will move the base member and the wheel in response to forces exerted on the base member.

The supporting wheel assembly according to the present invention can be manufactured separately for retrofitting existing walkers, or for attachment to other movable units as appropriate. The supporting wheel assembly of the present invention provides a method of braking a wheeled vehicle which it supports. The method of braking includes positioning at least one wheel angled relative to the direction of travel of the supported vehicle when a vertical force on the wheel is above a threshold value. The supporting wheel assembly of the present invention may position the wheel at an angle with respect to a direction of travel of the supported vehicle when the verticle force on the wheel is below another threshold value. Further, the supporting wheel assembly of the present invention may position the wheel aligned with the direction of travel of the supported vehicle when the verticle force on the wheel is between the two threshold values.

Specific embodiments of the present invention may provide that the wheel alignement mechanism for each supporting wheel assembly includes an engaging pin slidably engaging a slot. Several embodiments of the present invention provide that the pin be attached to the base member. One embodiment of the present invention provides that the pin is formed as an axle of the wheel. Certain embodiments of the present invention provide that the wheel alignment mechanism includes a housing attached to the supported vehicle and slidably supporting the base member therein, with the slot formed in the housing. Another embodiment of the present invention includes that the pin may be attached to the leg of a walker with the slot being formed in the base member.

The supporting wheel assembly of the present invention may be provided with a biasing mechanism for biasing the base member toward a first position. The biasing member may further be provided as adjustable to adjust the biasing force exerted on the base member.

These and other advantages of the present invention will be clarified in the description of the preferred embodiment taken together with the attached figures wherein like reference numerals represent like elements throughout.

BRIEF DESCRIPTION OF THE DRAWINGS

FIG. 6*b* is an enlarged section of a portion of the supporting wheel assembly illustrated in FIG. 6*a.

DETAILED DESCRIPTION OF THE PREFERRED EMBODIMENTS

Figure 1:
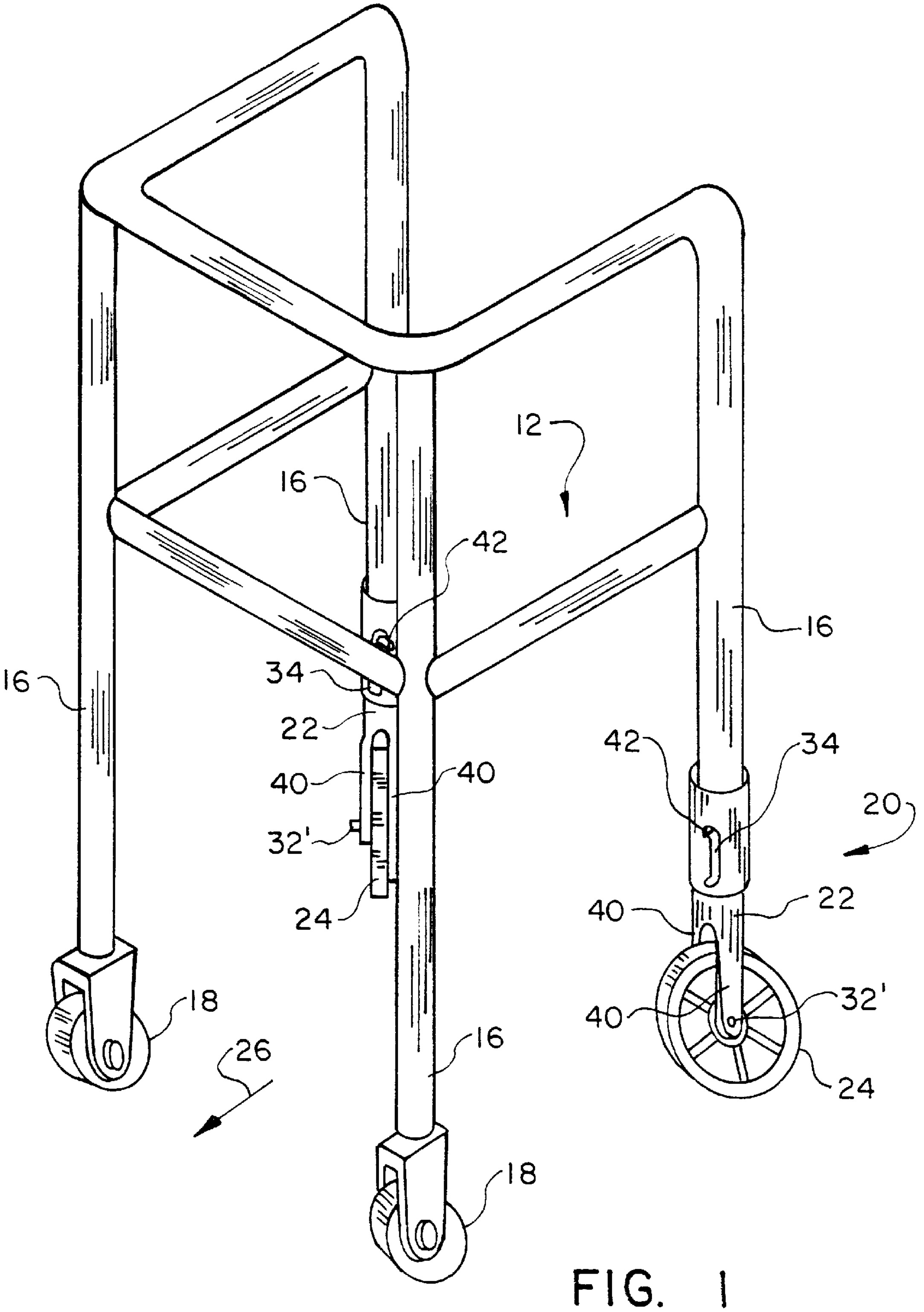
FIG. 1 is a perspective view of a walker including a supporting wheel assembly of the present invention.

FIG. 1 illustrates a walker 10 according to the present invention. The walker 10 is comprised of a frame 12 which includes handholds or user supports 14 at an upper portion of the frame 12 and four legs 16 extending downwardly. The frame 12 opens rearwardly to the user allowing the user to essentially move within or into the frame 12. The frame 12 is typically formed out of lightweight tubular metal material as is well known in the art. The front legs 16 include roller supports 18, such as casters at the bottom end thereof. The roller supports 18, may be formed as self-aligning casters or other designs known in the art. The rear legs 16 are attached to supporting wheel assemblies 20 made in accordance with the present invention. Each supporting wheel assembly 20 includes a base member 22, a wheel 24 rotationally supported on the base member 22, supported on the base members 22 and a wheel alignment mechanism for moving the base member 22 and the wheel 24 between at least a first position in which the wheel 24 is angled with respect to a direction of travel 26 of the walker 10 and a second position in which the wheel 24 is aligned with the direction of travel 26 of the walker 10. The wheel alignment mechanism will move the base member 22 and wheel 24 in response to a vertical force exerted on the base member 22 and wheel 24 as will be described in greater detail hereinafter.

Figure 2A:
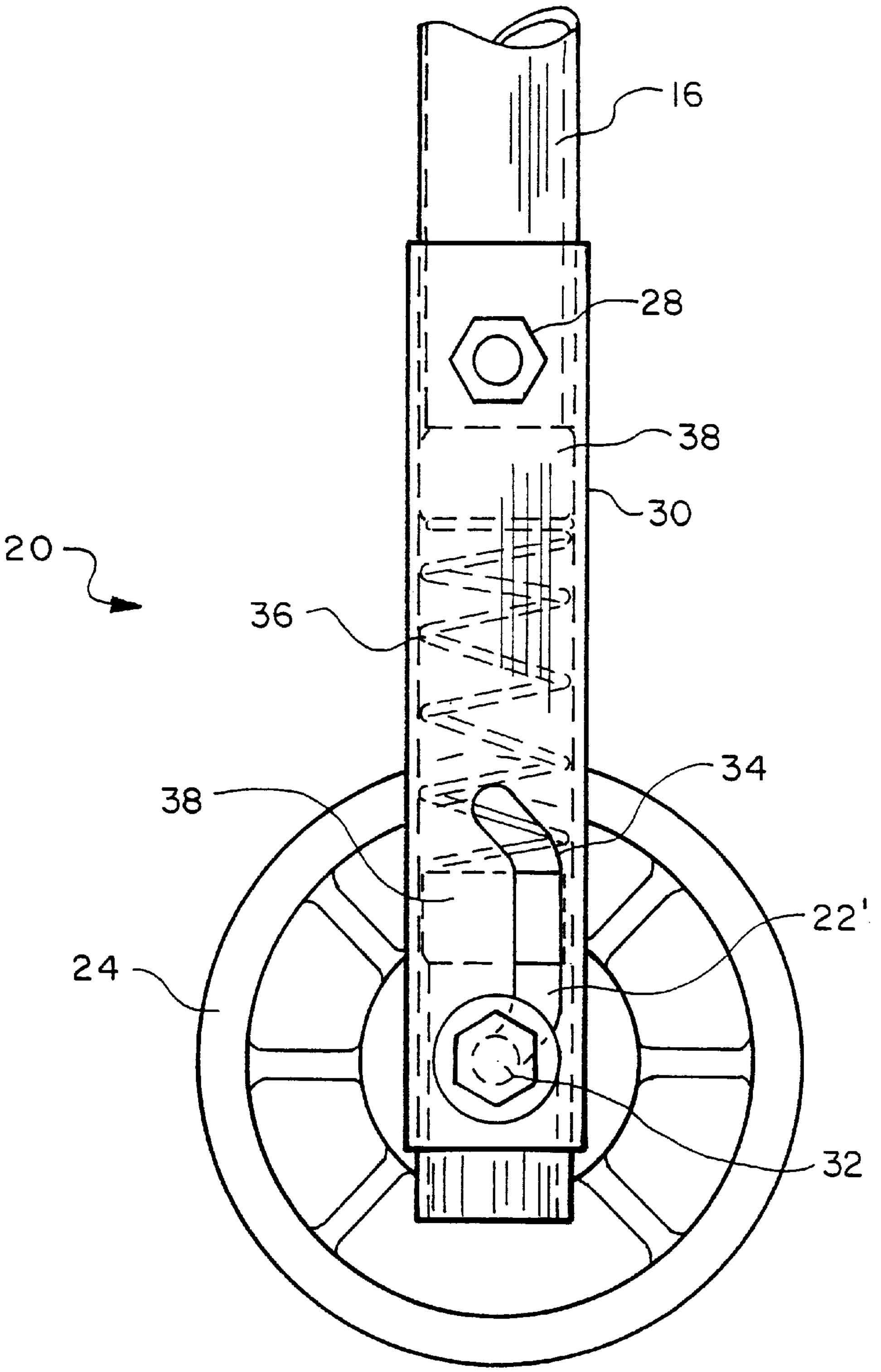
FIG. 2*a* is an enlarged side view of a supporting wheel assembly according to a first embodiment of the present invention.
Figure 2B:
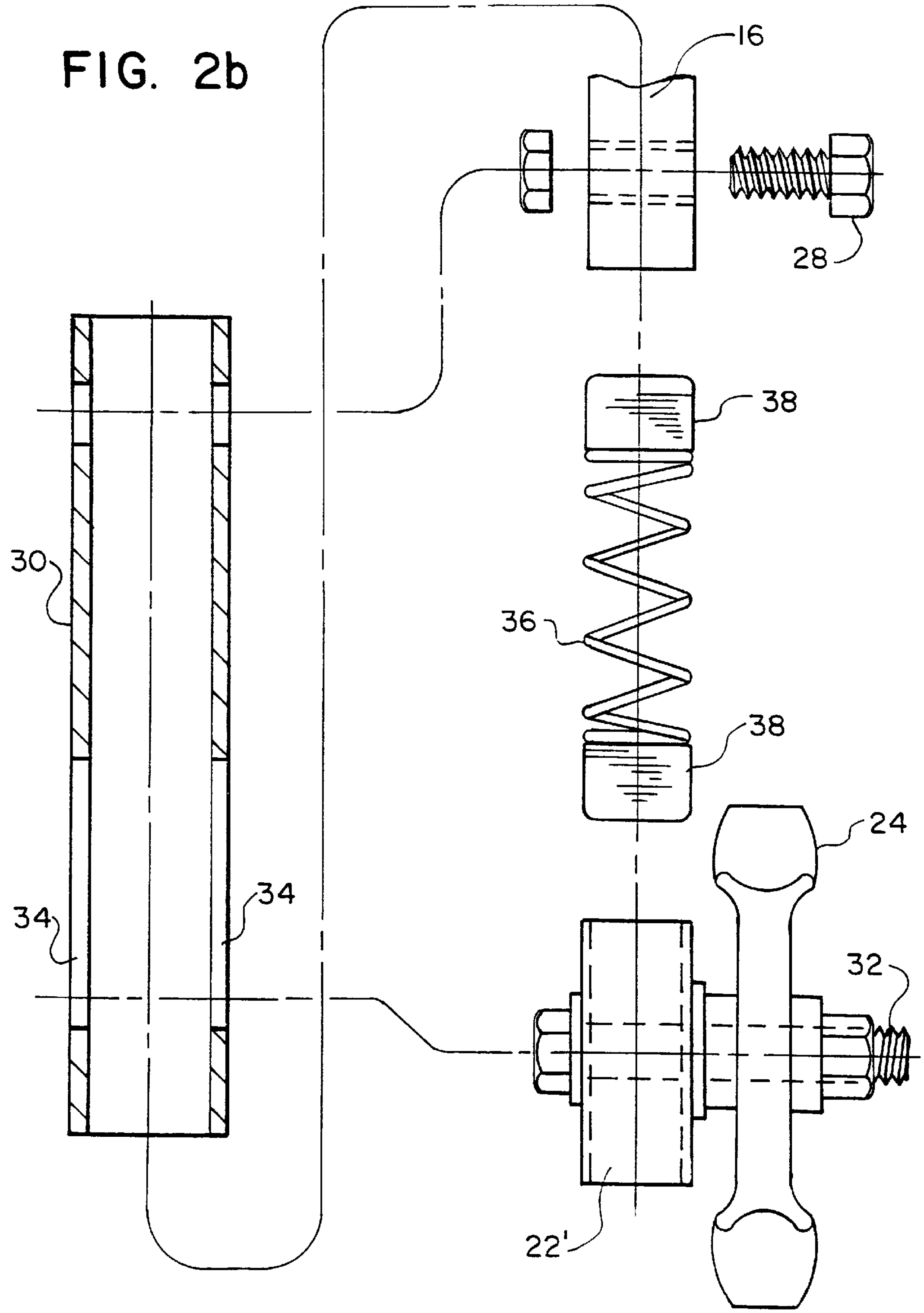
FIG. 2*b* is an exploded view partially in cross-section of the supporting wheel assembly illustrated in FIG. 2*a;*

FIGS. 2*a* and 2*b* illustrate a supporting wheel assembly 20 according to one embodiment of the present invention. In this embodiment, the wheel assembly 20 attached to the leg 16 by a threaded nut and bolt connection 28 extending through the leg 16 and through a tubular cylindrical housing 30 of the supporting wheel assembly 20. The tubular cylindrical housing 30 slidably supports a base member 22 therein. The base member 22' rotationally supports the wheel 24 thereon by axle 32. The axle 32 also extends through a pair of c-shaped slots 34 formed at opposite sides of the tubular cylindrical housing 30. In this context, the axle 32 acts as a pin riding in the slot 34 as will be described hereinafter. The wheel assembly 20 additionally includes a spring 36 positioned between a pair of end caps 38 mounted within the tubular cylindrical housing 30. The spring 36 is used to bias the base member 22 prime, wheel 24 and axle 32 toward the lowest position defined by slots 34. The tension or force exerted by the springs 36 can be adjusted by adding appropriate spaces within the end caps 38. If further adjustment is required, the relative position of the leg 16 within the tubular cylindrical housing 30 of the wheel assembly 20 may be adjustable such as by providing a different hole in the leg 16 for receipt of the nut and bolt connection 28. This modification can also be used to adjust the overall height of the walker 10.

Figure 3A:
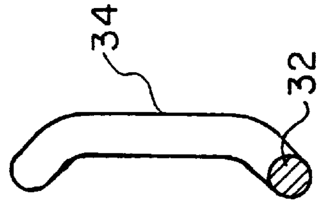
FIGS. 3*a* and 3*b* schematically illustrated the respective positions of a wheel alignment mechanism and the wheels of the walker illustrated in FIG. 1, with the wheels in a first position corresponding to a first range of force exerted on the walker.
Figure 3B:
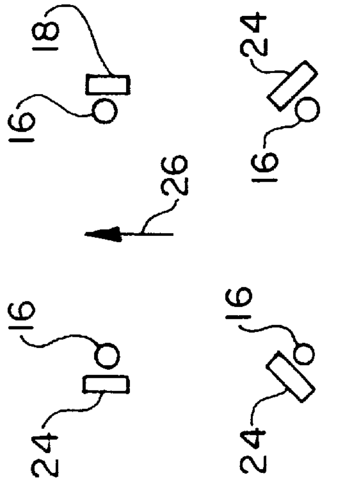

The operation of the walker 10 utilizing the supporting wheel assemblies 20 of the present invention will be clarified in the description of FIGS. 3*a*–5*b*. FIGS. 3*a* and 3*b* illustrate the relative positioning of the wheel alignment mechanism and the wheels 24 with the vertical force, or weight, exerted on the walker 10 less than a first threshold value. This first threshold value is essentially determined by the force exerted by the spring 36 on the base member 22' which can be adjusted as discussed above. Until a certain minimum weight or force is exerted on the walker 10, the wheel 24, base member 22' and axle 32 are maintained in the first position as shown in FIG. 3*b*. In the first position, each wheel 24 is angled with respect to the direction of travel 26 of the walker 10. Preferably, each wheel 24 is angled at approximately 45° relative to the direction of travel 26 of the walker 10 such that two wheels 24 are substantially at a 90° angle relative to each other as shown in FIG. 3*b*. In this first position, the perpendicular orientation of the wheels 24 together with the angling of each of the wheels 24 relative to the direction of travel 26 of the walker 10 will effectively brake the walker 10 preventing the walker 10 from moving.

Figure 4A:
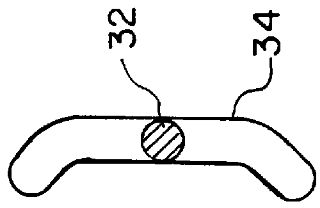
FIGS. 4*a* and 4*b* schematically illustrate the respective positions of the wheel alignment mechanism and the wheels of the walker illustrated in FIG. 1 with the wheels in a second position corresponding to a second range of force on the walker.
Figure 4B:
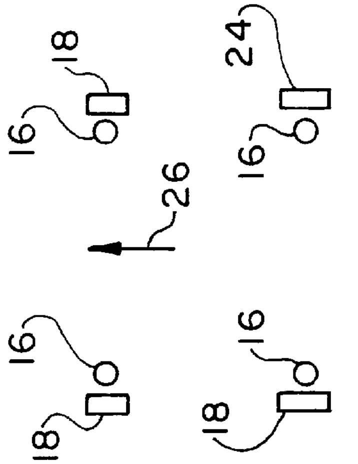

FIGS. 4*a* and 4*b* illustrate the relative position of the wheel positioning mechanism and the wheels 24 when the weight or vertical force on the walker 10 is between the first threshold value and a second threshold value. The second threshold value is also adjustable depending on the length of the slot 34, the characteristics of the spring 36, and the amount of tension originally placed in the spring 36. In this second position, the axle 32 and the associated wheel 24 and base member 22' have moved along slot 34 to the relatively straight intermediate portion. The curved nature of the lowermost position of the slot 34 will act to turn the wheels 24 to a position where the wheels 24 are substantially aligned with the direction of travel 26 of the walker 10 as illustrated in FIG. 4*b*. This position is intended to be the operative position for the walker 10 wherein the user can easily roll or advance the walker 10. The operative position is automatically achieved with the desired amount of pressure between the first threshold value and the second threshold value on the walker 10. As discussed above, the specific operative range can be selected as desired, however, a range of approximately 5–15 pounds is believed to be an effective operative range.

Figure 5A:
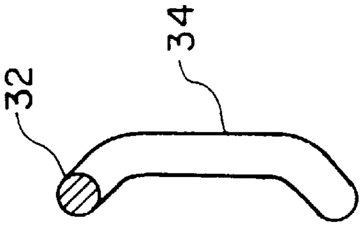
FIGS. 5*a* and 5*b* schematically illustrate the respective positions of the wheel alignment mechanism and the wheels of the walker illustrated in FIG. 1, with the wheels in a third position corresponding to a third range of force exerted on the walker.
Figure 5B:
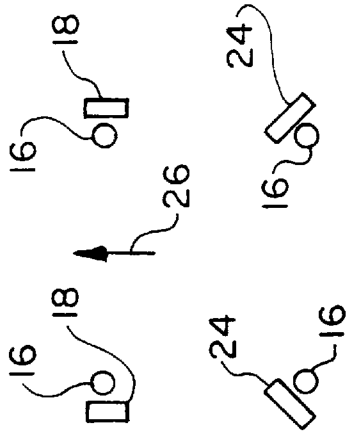

FIGS. 5*a* and 5*b* illustrate the respective positions of the wheel positioning mechanics and the wheels 24 when the force or weight on the walker 10 is above the second threshold value. When the weight on the walker 10 exceeds the second threshold value, the axle 32, wheels 24 and base member 22' will move to the upper portion of the slot 34 against the action of the spring 36. This curved portion of the slot 34 will again act to move the associated wheel 24 to a position in which the wheel 24 is angled with respect to the direction of travel 26 of the walker 10. Specifically, it is preferred that each wheel 24 be at an angle of approximately 45° with respect to the direction of travel 26 of the walker 10 and that both rear wheels 24 are substantially perpendicular to each other as shown in FIG. 5*b*. As with the initial position illustrated in FIGS. 3*a* and 3*b,* this position essentially brakes the walker 10 preventing the walker 10 from moving. This operative feature of the present invention increases the safety of the overall device. The increase of weight or pressure on the walker 10 can be indicative of the walker slipping out of position or the patient stumbling. The braking of the walker 10 will automatically prevent the walker 10 from continuing to slide away from the patient. Once the patient recovers his/her balance, the walker 10 can be returned to the operative position illustrated in FIGS. 4*a* and 4*b* by reducing the pressure or weight on the walker below the second threshold value, and above the first threshold value. The positions illustrated in FIGS. 5*a* and 5*b* can also be designed to be the operative position when the patient is exerting typical force on the walker 10 for the patient to move forward. In other words, after the patient has sufficiently advanced the walker 10, the patient will lean on the walker 10 to move himself forward and the wheels 24 will move to the position shown in FIG. 5*b* by proper setting of the second threshold value.

The supporting wheel assembly 20 of the present invention is specifically designed to be easily retrofitted to existing walkers or the like. Each supporting wheel assembly 20 will have a first and second threshold value of its own. These threshold values will correspond to the threshold values of the walker 10 based upon the specific construction of the frame 12 and the number of rear legs 16. The supporting wheel assemblies 20 may be used in other devices aside from walkers.

Figure 6A:
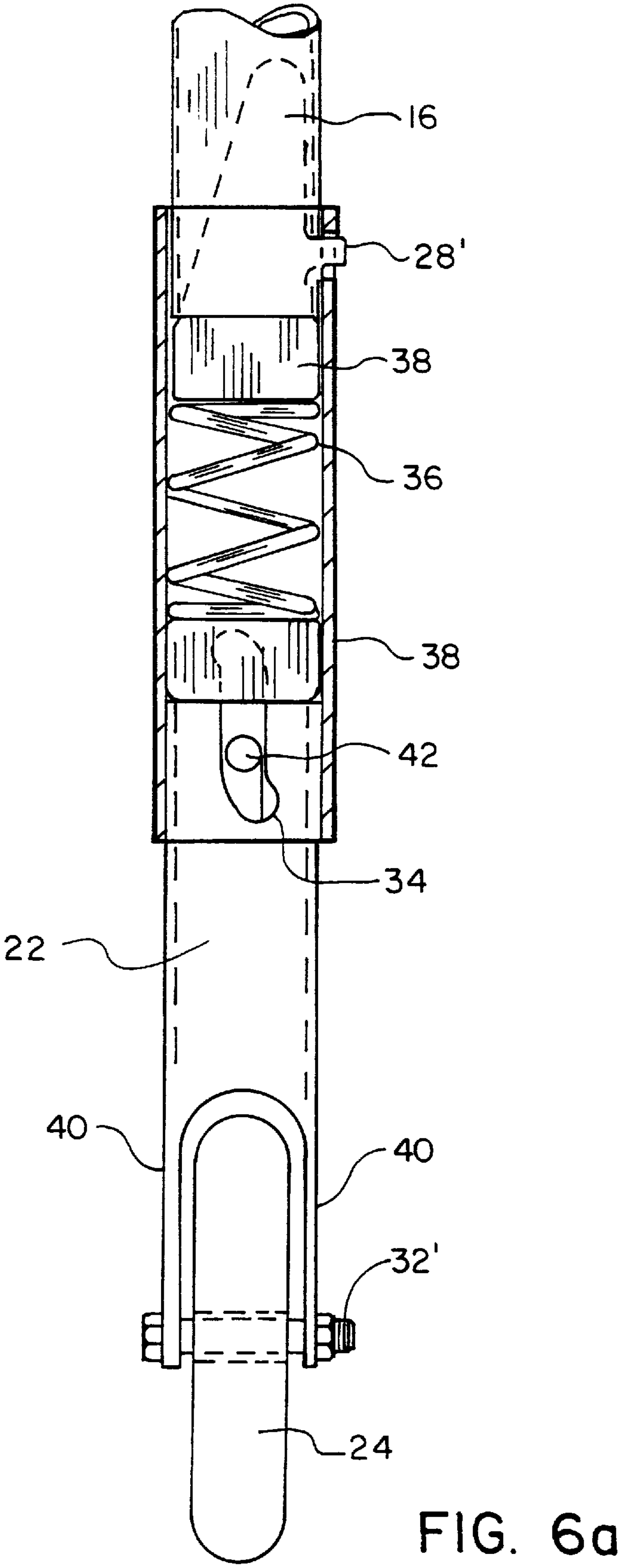
FIG. 6*a* is an enlarged front view, partially in section, of a supporting wheel assembly according to a second embodiment of the present invention.
Figure 6B:
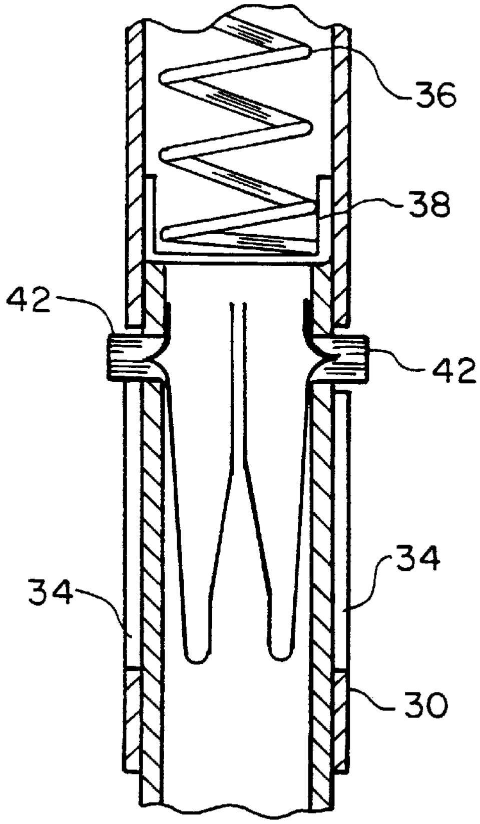

FIGS. 6*a* and 6*b* illustrate a supporting wheel assembly 20 according to another embodiment of the present invention. The supporting wheel assembly 20 illustrated in FIGS. 6*a* and 6*b* substantially conforms to the supporting wheel assembly 20 illustrated in FIG. 1. The supporting wheel assembly 20 illustrated in FIGS. 6*a* and 6*b* includes a base member 22 rotatably supporting a wheel 24 on an axle 32' formed on a split yoke 40 formed at the lower portion of base member 22. The base member 22 is slidably supported within a tubular cylindrical housing 30 which is attached to leg 16 of the walker 10. FIG. 6*a* illustrates an alternative type of connection 28' in the form of a detent pin extending from the leg 16 of the walker 10. Such detent pins are found on existing walkers and is being illustrated to show other types of conventional attachments for the tubular cylindrical housing 30. The supporting wheel assembly 20 illustrated in FIGS. 6*a* and 6*b* additionally includes spring 36 between end caps 38 for biasing the base member 22 and the wheel 24 toward the first position essentially illustrated in FIG. 3*b*. The supporting wheel assembly 20 illustrated in FIGS. 6*a* and 6*b* differs most substantially from the supporting wheel assembly illustrated in FIGS. 2*a* and 2*b* by including pins 42 which engage slots 34 in the tubular cylindrical housing 30. The pins 42 are separate from axle 32' in the embodiment shown in FIGS. 6*a* and 6*b*. The pins 42 are spring biased detent members extending from the interior of the base member 22 into the slots 34 in the tubular cylindrical housing 30 as bests illustrated in FIG. 6*b*. The spring biased nature of the pins 42 allows for the original insertion of the base member 22 into the tubular cylindrical housing 30 by depressing both pins 42. The supporting wheel assembly 20 illustrated in FIGS. 6*a* and 6*b* operates substantially identical to the supporting wheel assemblies 20 discussed above with connection to FIGS. 3*a*–5*b*.

Figure 7:
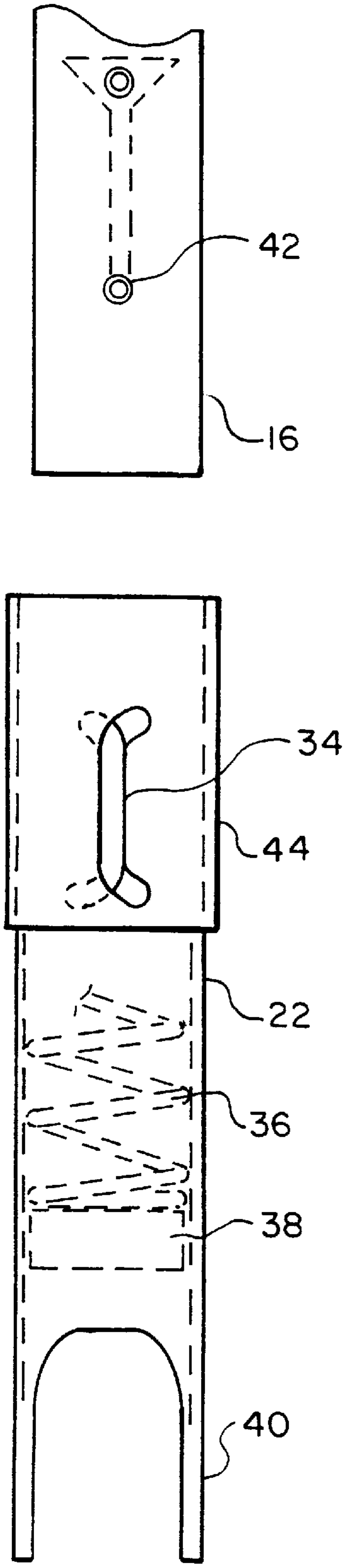
* and FIG. 7 is an exploded view of a portion of a supporting wheel assembly according to a third embodiment of the present invention.

FIG. 7 illustrates another embodiment of the supporting wheel assembly 20 according to the present invention. In this embodiment, the base member 22 includes a split yoke 40 at a bottom portion thereof for supporting a wheel 24 and axle 32' (not illustrated in FIG. 7) the same as illustrated in FIG. 6*a*. In the embodiment illustrated in FIG. 7, the base member 22 includes and enlarged upper portion 44 which receives the leg 16 of the walker therein. The enlarged upper portion 44 includes a plurality of c-shaped slots 34 formed therein. In the embodiment illustrated in FIG. 7, the spring biased pins 42 are positioned within the leg 16 of the walker 10 to engage with slots 34 in the enlarged upper portion 44. End cap 38 and spring 36 are provided to bias the leg 16 and pins 42 to the upper portion of the slot 34. In operation, the supporting wheel assembly 20 illustrated in FIG. 7 is similar to the operation illustrated in FIGS. 3*a*–5*b*, however, their respective positions are reversed. Specifically, the first position corresponding to a force on the walker 10 below the first threshold value corresponds to the pins 42 being positioned in the uppermost portion of the slot 34 and the third position of the wheels 24 corresponding to a force on the walker 10 being above the second threshold value will correspond to a position of the pins 42 in the lower most portion of the slot 34. Effectively, however, the supporting wheel assembly 20 operates in essentially the same manner as the wheel assemblies illustrated in FIGS. 2*a* and 2*b* and 6*a* and 6*b*.

The supporting wheel assemblies 20 of the present invention are not limited for use in walkers. These wheel assemblies have other applications such as attachment to load transportation carts to prevent excessive weight from being transported on the cart. The supporting wheel assemblies 20 of the present invention, when attached to a load transportation cart, will prevent the use of the cart above the second threshold value. As with the walker 10 of the present invention, when the transportation cart is loaded above a preset limit of the second threshold value, the wheels 24 will be canted relative to the direction of travel 26 to essentially brake the cart preventing movement of the cart under excessive load. This is only intended to be illustrative of the various applications of the supporting wheel assembly 20 of the present invention. Other applications are easily within the skill of one of ordinary skill in the art. For example, in certain applications, it may be desired to have the lower or upper threshold at zero such that the wheels are originally (i.e. with no load) aligned with the direction of travel. It will be apparent to those of ordinary skill in the art that various changes may be made to the present invention without departing from the spirit and scope thereof. Consequently, the scope of the present invention is intended to be defined by the appended claims and equivalents thereto.

We claim:

1. A supporting wheel assembly adapted to be attached to a supported moveable unit that defines a forward direction of travel of said supported moveable unit, said supporting wheel assembly comprising:

a base member;

a wheel rotatably supported on said base member; and a wheel alignment mechanism for moving said base member and said wheel between at least one position in which said wheel is angled with respect to said forward direction of travel of the moveable unit and another position in which said wheel is aligned with said forward direction of travel of the moveable unit, wherein said wheel alignment mechanism moves said base member and said wheel in response to a vertical force exerted on said base member and said wheel.

2. The supporting wheel assembly of claim 1, wherein said wheel alignment mechanism includes a housing attached to said moveable unit and slidably supporting said base member.

3. The supporting wheel assembly of claim 1, wherein said wheel alignment mechanism includes an engaging pin slidably engaging a slot.

4. The supporting wheel assembly of claim 3, wherein said pin is attached to said base member.

5. The supporting wheel assembly of claim 4, wherein said pin is formed as with an axle of said wheel.

6. The supporting wheel assembly of claim 4, wherein said wheel alignment mechanism includes a housing attached to said movable unit and slidably supporting said base member, and wherein said slot is formed in said housing.

7. The supporting wheel assembly of claim 3, wherein said pin is attached to a leg of the movable unit and said slot is formed within said base member.

8. The supporting wheel assembly of claim 1, further including a biasing member biasing said base member.

9. The supporting wheel assembly of claim 8, wherein said biasing member is adjustable to adjust said biasing force on said base member.

10. The supporting wheel assembly of claim 1, wherein said wheel adjustment mechanism moves said base member and said wheel to a third position in which said wheel is angled with respect to said forward direction of travel of the movable unit.

11. The supporting wheel assembly of claim 10, wherein each said wheel in said one position corresponds to a range of force exerted on said base member below a first threshold value, and said wheel in said another position corresponds to a range of force exerted on said base member between said first threshold value and a second threshold value, and said wheel in said third position corresponds to a range of force exerted on said base member above said second threshold value.

12. A walker comprising:

a walker frame including user supports and a plurality of legs said walker frame defining a forward direction of travel of said walker; and a wheel assembly attached to at least one said walker leg, each said wheel assembly including
  (i) a base member,
  (ii) a wheel rotatably supported on said base member, and
  (iii) a wheel alignment mechanism for moving said base member and said wheel between at least a first position in which said wheel is angled relative to said forward direction of travel of said walker and a second position in which said wheel is aligned with said forward direction of travel of said walker, wherein said wheel alignment mechanism moves said base member and said wheel in response to a vertical force exerted on said base.

13. The walker of claim 12, wherein said walker includes a plurality of rear legs, each said rear leg including one said wheel assembly attached thereto.

14. The walker of claim 13, wherein said walker includes a plurality of front legs, each said front leg including a rolling support member attached thereto.

15. The walker of claim 12, wherein said wheel in said first position of one of said wheel assemblies on one said rear leg is positioned at about 90° with respect to said wheel in said first position of another of said wheel assemblies on another said rear leg.

16. The walker of claim 12, wherein said wheel alignment mechanism of each said wheel assembly moves said base member and said wheel to a third position in which said wheel is angled with respect to said forward direction of travel of said walker.

17. The walker of claim 16, wherein said wheel of each said wheel assembly in said first position corresponds to a range of force exerted on said base member below a first threshold value, said wheel in said second position corresponds to a range of force exerted on said base member between said first threshold value and a second threshold value, and said wheel in said third position corresponds to a range of force exerted on said base member above said second threshold value.

18. A method of braking a wheel of a wheeled walker comprising the step of moving at least one wheel of said walker to a position at an angle with respect to a forward direction of travel of said walker when a vertically downward force on said walker is above a threshold value.

19. The method of claim 18, further including the step of moving at least one wheel of said walker to a position at an angle with respect to said direction of travel of said walker when a vertical force on said walker is below another threshold value.

20. The method of claim 19 further including the step of aligning at least one wheel of said walker with the direction of travel of said walker when a vertical force on said walker is between said threshold values.

* * * * *